(12) United States Patent
Svendsen et al.

(10) Patent No.: US 12,425,094 B2
(45) Date of Patent: Sep. 23, 2025

(54) ANTENNA CONFIGURATION SELECTION

(71) Applicant: NOKIA TECHNOLOGIES OY, Espoo (FI)

(72) Inventors: Simon Svendsen, Aalborg (DK); Johannes Harrebek, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 198 days.

(21) Appl. No.: 18/109,325

(22) Filed: Feb. 14, 2023

(65) Prior Publication Data

US 2023/0261725 A1 Aug. 17, 2023

(30) Foreign Application Priority Data

Feb. 16, 2022 (EP) .................................. 22156997

(51) Int. Cl.
*H04B 7/08* (2006.01)
*H01Q 3/36* (2006.01)
(Continued)

(52) U.S. Cl.
CPC ............. *H04B 7/0802* (2013.01); *H01Q 3/36* (2013.01); *H04B 7/0404* (2013.01); *H04W 64/006* (2013.01)

(58) Field of Classification Search
CPC .. H04B 7/0404; H04B 7/0695; H04B 7/0802; H04B 7/088; H04B 7/10; H01Q 3/36;
(Continued)

(56) References Cited

U.S. PATENT DOCUMENTS 11,477,752 B1 * 10/2022 Harrebek ................ H04W 8/24
2010/0123625 A1    5/2010 Martin et al.
(Continued)

FOREIGN PATENT DOCUMENTS

CN      106443722 A     2/2017
WO      2020/108782 A1  6/2020

OTHER PUBLICATIONS

Extended European Search Report issued in corresponding European Patent Application No. 22156997.3 dated Jul. 21, 2022.
(Continued)

*Primary Examiner* — Siu M Lee
(74) *Attorney, Agent, or Firm* — SQUIRE PATTON BOGGS (US) LLP

(57) ABSTRACT

An apparatus, method and computer program is described comprising: determining an angular radiation space of interest for communications between a user device and a network node of a mobile communication system; obtaining a positioning metric for each of a plurality of available antenna configurations for communication between the user device and the network node in the angular radiation space of interest, wherein said positioning metrics are based, at least in part, on average antenna phase center offset vector data and phase center offset variance data for the user device; and selecting one of said plurality of antenna configurations, based on the obtained positioning metrics, for sending positioning signals from the user device to the network node or for receiving positioning signals at the user device from the network node.

15 Claims, 14 Drawing Sheets

(51) Int. Cl.
*H04B 7/0404* (2017.01)
*H04W 64/00* (2009.01)

(58) Field of Classification Search
CPC ... H04W 64/006; H04W 4/025; H04W 4/029; G01S 5/021; G01S 5/0221; G01S 5/0226
See application file for complete search history.

(56) References Cited

U.S. PATENT DOCUMENTS

| | | |
|---|---|---|
| 2013/0181868 A1 | 7/2013 | Le Pezennec et al. |
| 2015/0326297 A1 | 11/2015 | Petersson et al. |
| 2020/0003816 A1 | 1/2020 | Bartko |
| 2023/0043489 A1* | 2/2023 | Angelo .................. G01S 19/04 |
| 2024/0224219 A1* | 7/2024 | Lee ....................... H04W 64/00 |
| 2024/0236901 A1* | 7/2024 | Yerramalli ........ H04W 56/0065 |
| 2025/0119864 A1* | 4/2025 | Bao ....................... H04W 24/02 |

OTHER PUBLICATIONS

Nokia et al., "Views on mitigating UE and gNB Rx/Tx timing errors", 3GPP Draft; RI-2109363, 3rd Generation Partnership Project (3GPP), vol. RAN WG1, No. e-Meeting; Oct. 2021, XP052058316.
First Office Action dated Jun. 19, 2025 corresponding to Chinese Patent Application No. 2023101245128, with English translation thereof.
Nokia et al., "Views on mitigating UE and gNB Rx/Tx timing errors," 3GPP Draft; R1-2105512, 3GPP TSG RAN WG1 #105-e, e-Meeting, May 10-27, 2021; May 11, 2021.

* cited by examiner

ANTENNA CONFIGURATION SELECTION

CROSS REFERENCE TO RELATED APPLICATION

This application claims the benefit of European Patent Application No. 22156997.3, filed Feb. 16, 2022. The entire content of the above-referenced application is hereby incorporated by reference.

FIELD

The present specification relates to antenna configuration selection for communications between a user device and a network node of a mobile communications system.

BACKGROUND

Some mobile communication systems provide multiple antenna configurations that are available for use for communications between a user device and a network node of a mobile communication system. There remains a need for further developments in this field.

SUMMARY

In a first aspect, this specification describes an apparatus comprising means for performing: determining an angular radiation space of interest for communications between a user device and a network node of a mobile communication system; obtaining a positioning metric for each of a plurality of available antenna configurations for communication between the user device and the network node in the angular radiation space of interest, wherein said positioning metrics are based, at least in part, on average antenna phase centre offset vector data and phase centre offset variance data for the user device; and selecting one of said plurality of antenna configurations, based on the obtained positioning metrics, for sending positioning signals from the user device to the network node or for receiving positioning signals at the user device from the network node. In some example embodiments, the apparatus is the said user device.

The means for performing selecting said one of said plurality of antenna configurations may be configured to select the antenna configuration of the plurality having the lowest average antenna phase centre offset vector data and phase centre offset variance data.

Some example embodiments further comprise means for performing: determining whether a beam is identified for communications between the user device and the network node and, if so, defining the angular radiation space of interest as a direction of said beam and, if not, defining the angular radiation space of interest as a widebeam angular space.

The positioning metrics may be based on antenna phase centre offset vector and variance data that have been measured or simulated in advance.

The positioning metrics may comprise average power weighted antenna phase centre offset vector and variance data.

The positioning metrics may comprise antenna phase centre offset vector and variance data combined into single data points. Furthermore, each of said single data points may comprise averages of antenna phase centre offset vector data points and corresponding antenna phase centre offset variance data points over the relevant angular radiation space.

The positioning metrics may comprise average antenna phase centre offset vector data and phase centre offset variance data for the user device for a first polarisation, a second polarisation and a combination of the first and second polarisations. Furthermore, in some example embodiments, the apparatus may further comprise means for performing: determining whether power signal levels are sufficient for sending or receiving said positioning signals using an antenna configuration having a single polarisation, wherein said means for selecting said one of said plurality of antenna configuration makes said selection accordingly.

The positioning metrics may comprise average antenna phase centre offset vector data and phase centre offset variance data for the user device for a first combination of first and second polarisations that are offset in phase relative to one another and a second combination of the first and second polarisations that are not offset in phase relative to one another. Furthermore, in some example embodiments, the apparatus may further comprise means for performing: determining whether power signal levels are sufficient for sending or receiving said positioning signals using an antenna configuration having a single polarisation, wherein said means for selecting said one of said plurality of antenna configuration makes said selection accordingly.

The said positioning metrics may comprise average antenna phase centre offset vector data and phase centre offset variance data for the user device in different antenna beam steering directions.

The positioning signals may comprise at least one of positioning reference signals and sounding reference signals.

In the first aspect described above, the said means may comprise: at least one processor; and at least one memory including computer program code, the at least one memory and computer program code configured to, with the at least one processor, cause the performance of the apparatus.

In a second aspect, this specification describes a method comprising: determining an angular radiation space of interest for communications between a user device and a network node of a mobile communication system; obtaining a positioning metric for each of a plurality of available antenna configurations for communication between the user device and the network node in the angular radiation space of interest, wherein said positioning metrics are based, at least in part, on average antenna phase centre offset vector data and phase centre offset variance data for the user device; and selecting one of said plurality of antenna configurations, based on the obtained positioning metrics, for sending positioning signals from the user device to the network node or for receiving positioning signals at the user device from the network node. In some example embodiments, the method is implemented (at least in part) at the said user device.

Selecting said one of said plurality of antenna configurations may including selecting the antenna configuration of the plurality having the lowest average antenna phase centre offset vector data and phase centre offset variance data.

The method may further comprise: determining whether a beam is identified for communications between the user device and the network node and, if so, defining the angular radiation space of interest as a direction of said beam and, if not, defining the angular radiation space of interest as a widebeam angular space.

The positioning metrics may be based on antenna phase centre offset vector and variance data that have been measured or simulated in advance.

The positioning metrics may comprise average power weighted antenna phase centre offset vector and variance data.

The positioning metrics may comprise antenna phase centre offset vector and variance data combined into single data points. Furthermore, each of said single data points may comprise averages of antenna phase centre offset vector data points and corresponding antenna phase centre offset variance data points over the relevant angular radiation space.

The positioning metrics may comprise average antenna phase centre offset vector data and phase centre offset variance data for the user device for a first polarisation, a second polarisation and a combination of the first and second polarisations. Furthermore, in some example embodiments, the method further comprises: determining whether power signal levels are sufficient for sending or receiving said positioning signals using an antenna configuration having a single polarisation, wherein selecting said one of said plurality of antenna configuration makes said selection accordingly.

The positioning metrics may comprise average antenna phase centre offset vector data and phase centre offset variance data for the user device for a first combination of first and second polarisations that are offset in phase relative to one another and a second combination of the first and second polarisations that are not offset in phase relative to one another. Furthermore, in some example embodiments, the method may further comprise: determining whether power signal levels are sufficient for sending or receiving said positioning signals using an antenna configuration having a single polarisation, wherein selecting said one of said plurality of antenna configuration makes said selection accordingly.

The said positioning metrics may comprise average antenna phase centre offset vector data and phase centre offset variance data for the user device in different antenna beam steering directions.

The positioning signals may comprise at least one of positioning reference signals and sounding reference signals.

In a third aspect, this specification describes computer-readable instructions which, when executed by a computing apparatus, cause the computing apparatus to perform (at least) any method as described with reference to the second aspect.

In a fourth aspect, this specification describes a computer-readable medium (such as a non-transitory computer-readable medium) comprising program instructions stored thereon for performing (at least) any method as described with reference to the second aspect.

In a fifth aspect, this specification describes an apparatus comprising: at least one processor; and at least one memory including computer program code which, when executed by the at least one processor, causes the apparatus to perform (at least) any method as described with reference to the second aspect.

In a sixth aspect, this specification describes a computer program comprising instructions for causing an apparatus to perform at least the following: determining an angular radiation space of interest for communications between a user device and a network node of a mobile communication system; obtaining a positioning metric for each of a plurality of available antenna configurations for communication between the user device and the network node in the angular radiation space of interest, wherein said positioning metrics are based, at least in part, on average antenna phase centre offset vector data and phase centre offset variance data for the user device; and selecting one of said plurality of antenna configurations, based on the obtained positioning metrics, for sending positioning signals from the user device to the network node or for receiving positioning signals at the user device from the network node. In some example embodiments, the computer program may be provided at said user device. Selecting said one of said plurality of antenna configurations may comprising selecting the antenna configuration of the plurality having the lowest average antenna phase centre offset vector data and phase centre offset variance data. The positioning signals may comprise at least one of positioning reference signals and sounding reference signals.

The computer program may comprise instructions for causing the apparatus to perform: determining whether a beam is identified for communications between the user device and the network node and, if so, defining the angular radiation space of interest as a direction of said beam and, if not, defining the angular radiation space of interest as a widebeam angular space.

In a seventh aspect, this specification describes a first module (such as a processor or some other means) for determining an angular radiation space of interest for communications between a user device and a network node of a mobile communication system; a second module (such as a database or some other means) for obtaining a positioning metric for each of a plurality of available antenna configurations for communication between the user device and the network node in the angular radiation space of interest, wherein said positioning metrics are based, at least in part, on average antenna phase centre offset vector data and phase centre offset variance data for the user device; and a third module (such as a control module, processor or some other means) for selecting one of said plurality of antenna configurations, based on the obtained positioning metrics, for sending positioning signals from the user device to the network node or for receiving positioning signals at the user device from the network node.

BRIEF DESCRIPTION OF THE DRAWINGS

Example embodiments will now be described, by way of example only, with reference to the following schematic drawings, in which.

DETAILED DESCRIPTION

Figure 1:
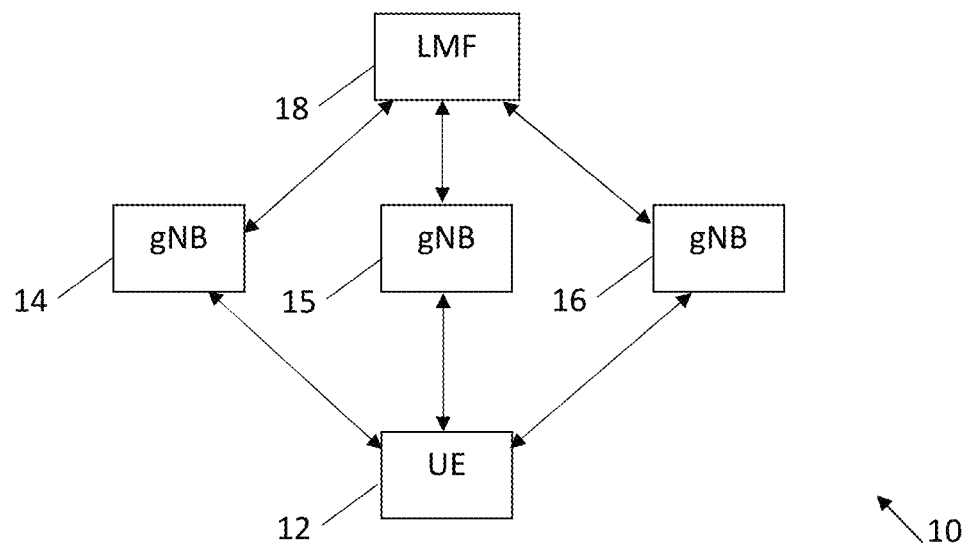
FIG. 1 is a block diagram of a system in which aspects of example embodiments may be used.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of a system, indicated generally by the reference numeral 10, in which aspects of example embodiments may be used.

The system 10 comprises a user equipment (UE) 12 that is in communication with first second and third base stations (gNBs) 14 to 16, one of which is a serving gNB. The UE and the gNBs may provide data to a location management function (LMF) 18 that may be used to estimate a location of the UE 12.

One method for determining UE location is to make use of Downlink Time Difference of Arrival (DL-TDOA) estimates. DL-TDOA can be either UE assisted, or UE based. For UE assisted positioning, the UE 12 measures positioning reference signal (PRS) time of arrival (TOA) data received from the gNBs 14 to 16 and reports a Reference Signal Time Difference (RSTD) to the LMF 18 for UE position calculation. For UE based positioning, the UE 12 receives information about the position of all involved gNBs in the positioning assistance data and the UE may estimate its own position based on this info and the PRS time of arrival (TOA) measurements.

Multi-cell round trip time (Multi-RTT) is another positioning method, which relies on both uplink (UL) and downlink (DL) measurements/signals. At a high level, the method works by multiple gNBs transmitting the DL PRS to the UE 12 and then the UE transmitting sounding reference signals (SRS) to the gNBs. The UE measures the UE Rx-Tx time difference for each cell while each gNB measures the gNB Rx-Tx time difference for the UE. All the measurements are reported to the LMF 18 which can then estimate the round trip time (RTT) to each gNB from the UE 12 and therefore can estimate the position of the UE.

The positioning methods described above are provided by way of example only. The skilled person will be aware of other positioning methods that may be used.

Figure 2:
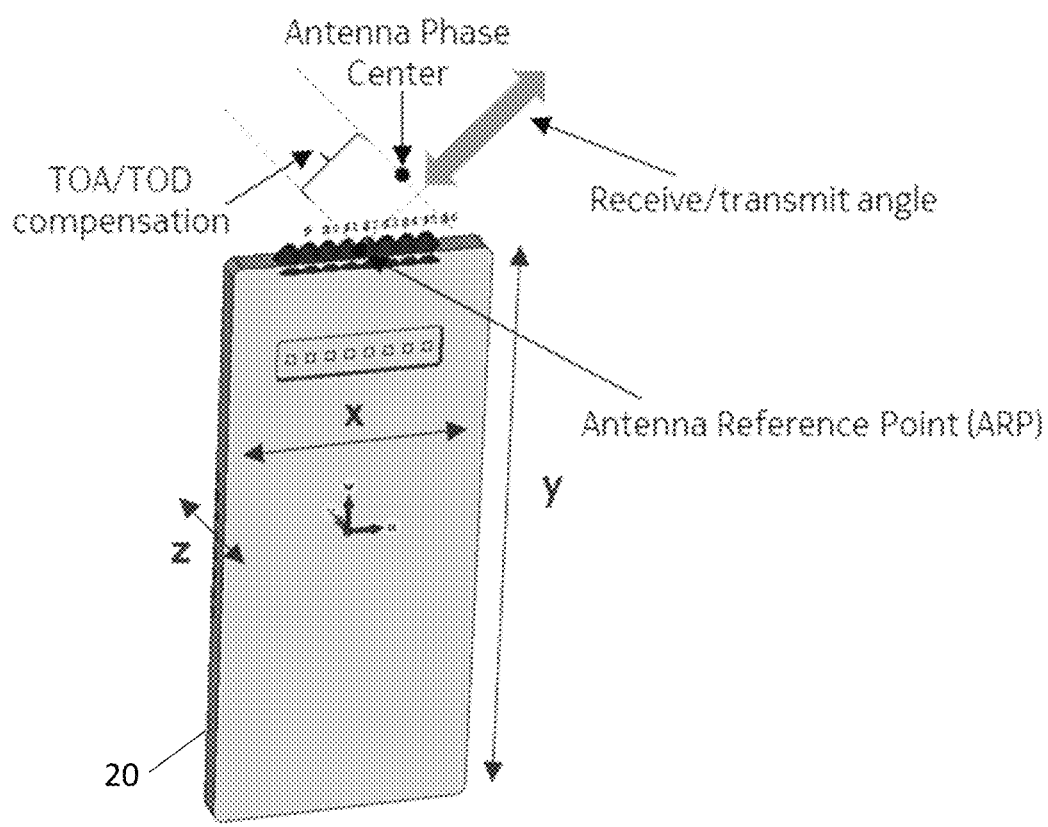
FIG. 2 is a block diagram of a user device in accordance with an example embodiment.

FIG. 2 is a block diagram of a user device 20 in accordance with an example embodiment. The user device 20 may be used as the UE 12 described above.

At the user device 20, an accurate assessment of downlink positioning reference signal (PRS) time of arrival (TOA) and/or uplink sounding reference signal (SRS) time of departure (TOD) may be required for obtaining accurate positioning measurements. In order to obtain accurate time of arrival (TOA)/time of departure (TOD) measurements, an accurate measurement of the phase reference position for the signal being received or transmitted via the UE antenna is required.

Referring to FIG. 2, this phase reference position is the antenna phase centre. As shown in FIG. 2, the antenna phase centre may not always align with the physical Antenna Reference Point (ARP), but may be located at an offset.

Figure 3:
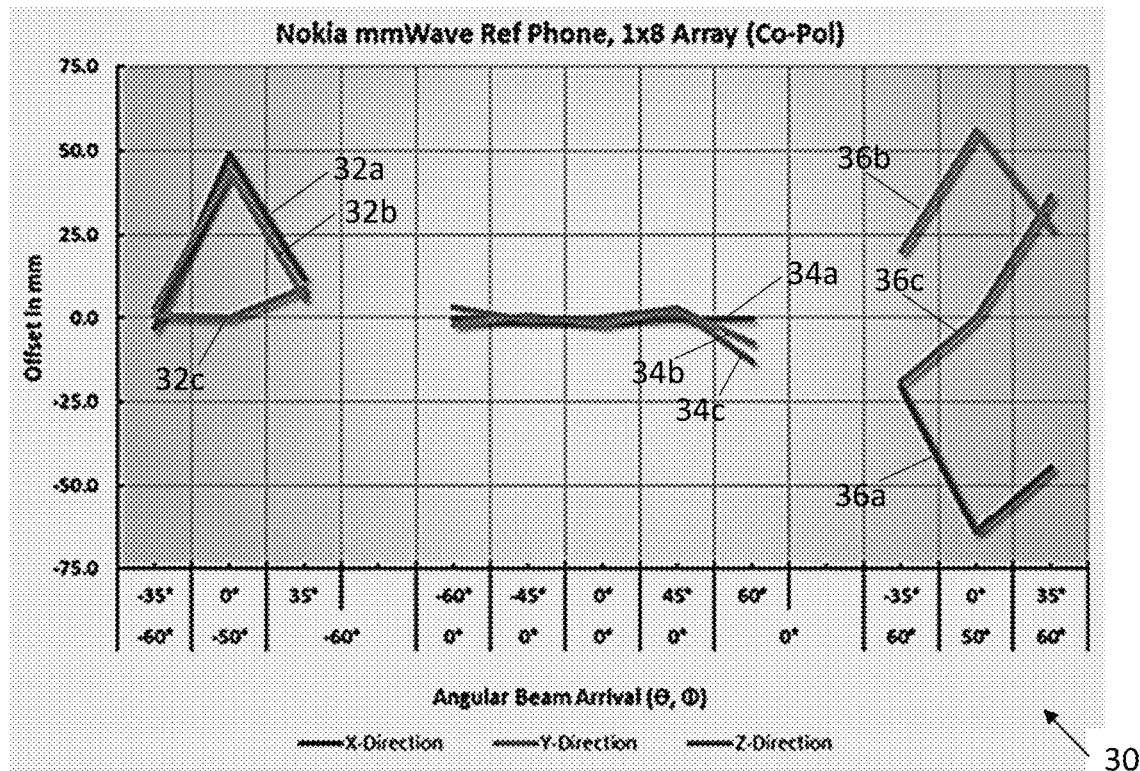
FIG. 3 is a plot demonstrating functionality of the user device of FIG. 2.

The UE antenna array phase centre location (i.e. the phase centre offset) is typically dynamic and sensitive to a range of factors, such as:

the UE form factor design (with current flow influenced by physical dimensions, mounted proximity components, materials, etc.);

the antenna array cover e.g. PC-ABS, glass;

the AOA/AOD and polarization of the positioning reference signal the configured beam on the antenna array (beam steering angle);

FIG. 3 is a plot, indicated generally by the reference numeral 30, showing phase centre offset (in mm) for an example UE having a 1:8 antenna array over a range of beam steering angles and having co-polarisation. A measurement of phase centre offset is plotted in each of x- y- and z-dimensions.

Specifically, phase centre offsets in x-, y- and z-dimensions are shows by the plots 32a, 32b and 32c respectively for angles of arrival between −35 degrees to +35 degrees for beam steering angles of −60 degrees or −50 degrees, phase centre offsets in x-, y- and z-dimensions are shows by the plots 34a, 34b and 34c respectively for angles of arrival between −60 degrees to +60 degrees for beam steering angles of 0 degrees and phase centre offsets in x-, y- and z-dimensions are shows by the plots 36a, 36b and 36c respectively for angles of arrival between −35 degrees to +35 degrees for beam steering angles of +50 degrees or +600 degrees.

As shown in the plot 30, the antenna array phase centre can vary dynamically by several centimetres. This can contribute to errors such as:

Tx timing error: From a signal transmission perspective, there will be a time delay from the time when the digital signal is generated at baseband to the time when the RF signal is transmitted from a Tx antenna. The phase centre offset of the Tx antenna is one component of this error.

Rx timing error: From a signal reception perspective, there will be a time delay from the time when the RF signal arrives at the Rx antenna to the time when the signal is digitized and time-stamped at the baseband. Again, the phase centre offset of the Rx antenna is one component of this error.

As discussed in detail below, both the absolute phase offset delay change (referred to as the PCO vector) and the statistical variance of the phase offset (PCO variance) will change as a function of the Angle of Arrival (AoA) and/or Angle of Departure (AoD) of the positioning reference signals. It may be possible to compensate for phase centre offset if the AoA and AoD are known, but this is not always the case.

The severity of the PCO vector and variance is dependent on many factors, including the placement of the antenna array, the form factor of the user device and the configured array beam.

Figure 4:
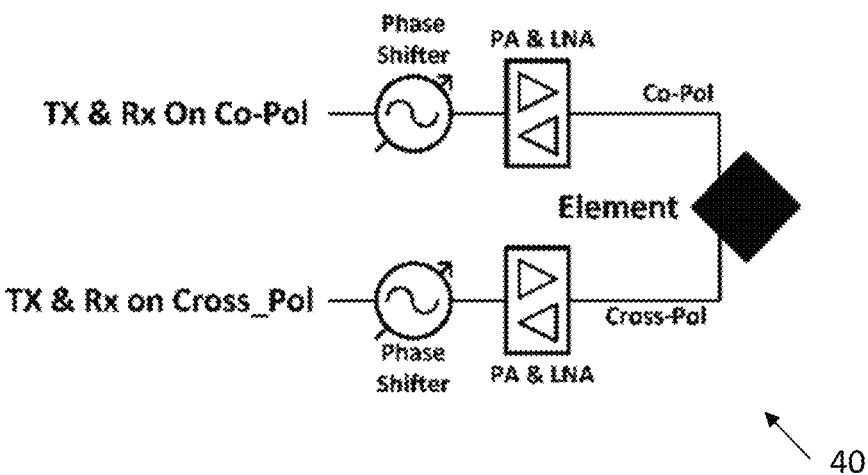
FIG. 4 is a block diagram of a system used in example embodiments.

The PCO vector and variance are not only dependent on the configured beam shape, but also the selected polarization (co-polarisation, cross-polarisation, or both). By way of example, FIG. 4 is a block diagram of a system, indicated generally by the reference numeral 40, used in example embodiments, in which both co-polarisation (Co-Po) and cross-polarisation (Cross-Pol) can be configured for transmission and reception.

Dual polarization may be a suitable configuration for receiving and transmitting data in many circumstances, since the use of both polarizations will generally improve the quality of the received and transmitted signals. In addition, some UEs may need to utilize all power amplifiers on both polarizations to transmit at maximum UE-EL power. Nevertheless, in some circumstances, alternative polarisation options may be preferable due to PCO vector and variance considerations.

Figure 5:
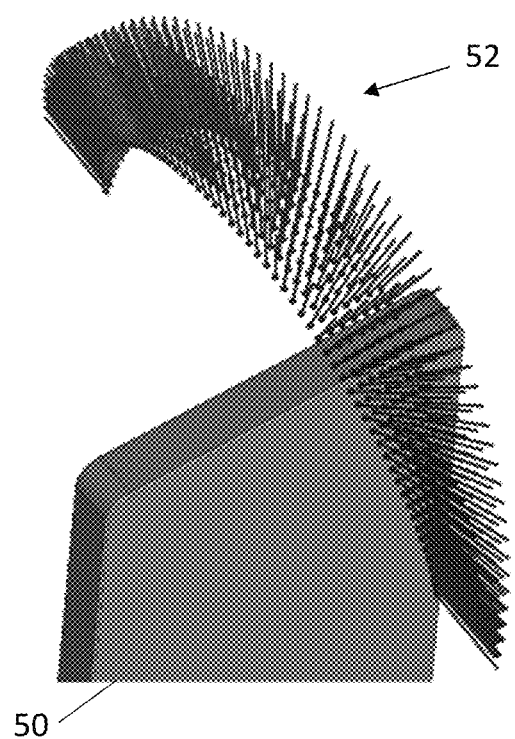
FIG. 5 is a block diagram of a user device showing a measurement arrangement in accordance with an example embodiment.

FIG. 5 is a block diagram of a user device 50 showing a measurement arrangement in accordance with an example embodiment. Specifically, the user device 50 shows angular sampling directions, indicated generally by the reference numeral 52, for measuring or simulating the PCO vector and variance. The sampling directions may correspond to boresight beam configurations that could be used for sending or receiving positioning reference signals. The example angular sampling directions 52 relate to different boresight beam configurations, with sample space ranging ±90° in θ and ±9° in Φ and with a granularity of 3°. Of course, many other sampling configurations are possible.

Figure 6:
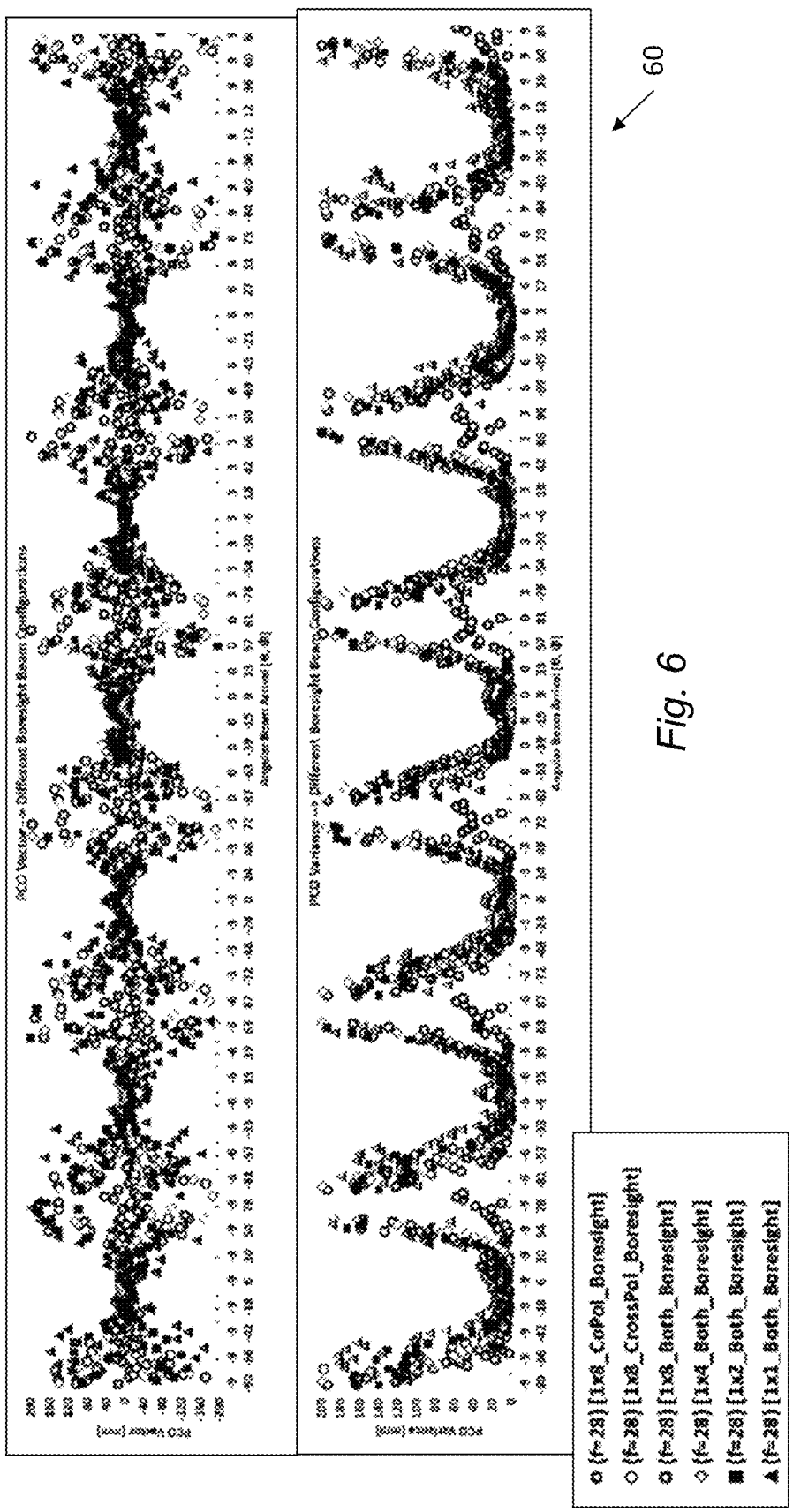
FIG. 6 is a plot showing data in accordance with an example embodiment.

FIG. 6 is a plot showing data, indicated generally by the reference numeral 60, in accordance with an example embodiment. The data 60 comprises PCO vector data (the upper plot) and PCO variance data (the lower plot) for different beam configurations over different angular directions and may be collected using the user device 50 described above.

The data 60 shows that additional delay caused by the PCO vector for these configured boresight beams will, for many angular directions, be as large as ±50 mm and even higher in some specific angular directions. The same can be observed for the variance of the absolute PCO vector value with variances higher than 70 mm. It is evident that appropriate beam configuration selection for the positioning reference signals can be important. This is particular the case when the UE has no knowledge of the positioning signal AoA/AoD.

Figure 7:
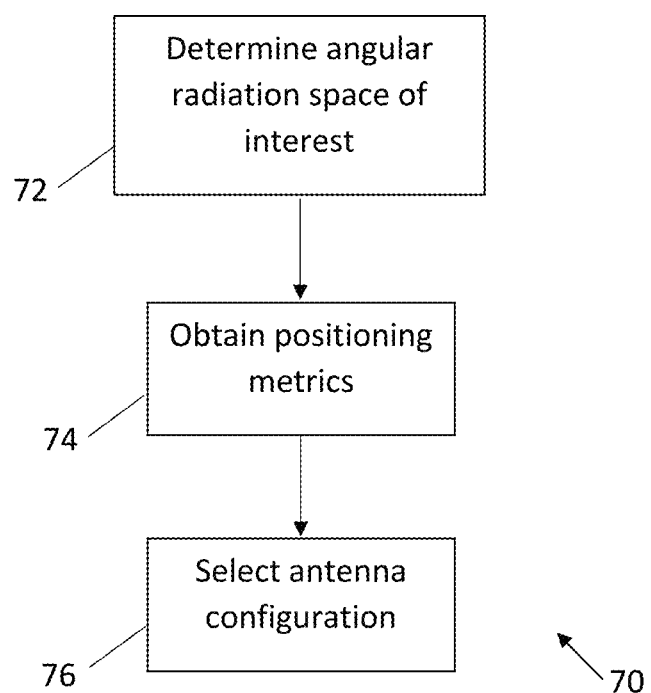
FIG. 7 is a flow chart showing a procedure in accordance with an example embodiment.

FIG. 7 is a flow chart showing a procedure, indicated generally by the reference numeral 70, in accordance with an example embodiment.

The procedure 70 starts at operation 72, where an angular radiation space of interest for communications between a user device and a network node of a mobile communication system is determined. The angular radiation space of interest may be the direction of the serving base station for the user device. It should be noted that in some example embodiments, this direction may be unknown, such that the angular radiation space corresponds to a widebeam signal.

At operation 74, a positioning metric is determined for each of a plurality of available antenna configurations for communication between the user device and the network node in the angular radiation space of interest. As discussed in detail below, the positioning metrics may comprise average antenna phase centre offset vector data and phase centre offset variance data for the user device. The said positioning metrics may be based on PCO vector and variance data that have been measured or simulated in advance.

At operation 76, one of the plurality of antenna configurations is selected, based on the obtained positioning metrics, for sending positioning signals from the user device to the network node or for receiving positioning signals at the user device from the network node. As discussed further below, the array beam configuration with the lowest average PCO vector and variance evaluated over the angular radiation space of interest may be selected.

The beam configuration selected for positioning reference signals in the operation 76 will in many cases be different to the optimal beam configuration for receiving and/or transmitting data, since the PCO vector or variance is not generally important for beams configured for data.

It should also be noted that the operation 76 may include determining whether power signal levels are sufficient for sending or receiving said positioning signals using an antenna configuration having a single polarisation, wherein said means for selecting said one of said plurality of antenna configuration makes said selection accordingly. Further details regarding the use of single and dual polarisation are provided below.

Figure 8:
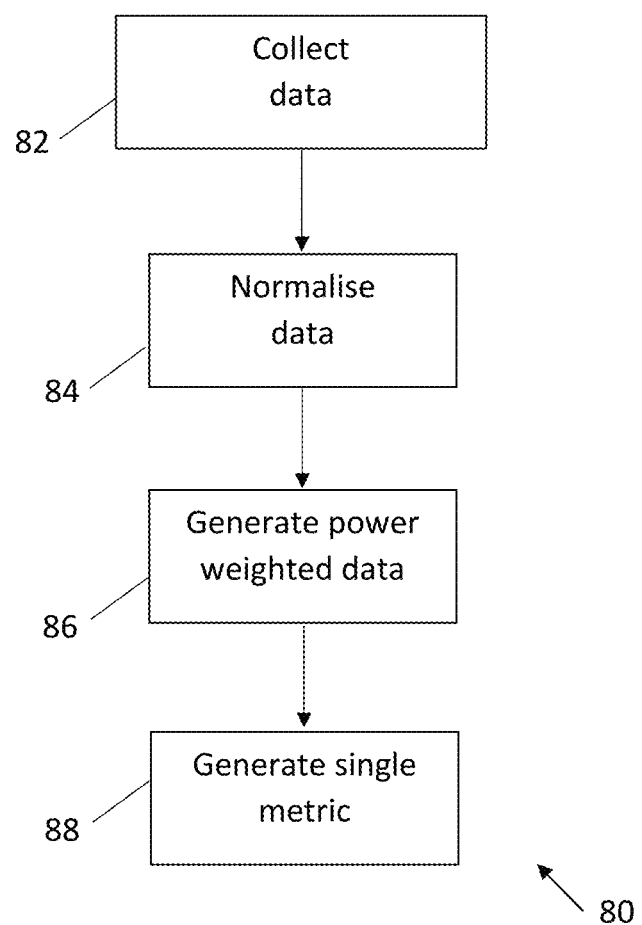
FIG. 8 is a flow chart showing a procedure in accordance with an example embodiment.

FIG. 8 is a flow chart, indicated generally by the reference numeral 80, showing a procedure in accordance with an example embodiment. The procedure 80 shows an example arrangement for the generation of positioning metrics that may be obtained in the operation 74 outlined above. It should be noted that the steps shown in the procedure 80 are provided by way of example only. The functionality of the procedure 80 may be implemented in other ways; for example, some or all of the steps may be merged.

The procedure 80 starts at operation 82, where PCO data is collected, such as the PCO vector and variance data 60 described above. The example data 60 contains many samples, which may ultimately complicate the assessment of which beam configuration should be selected in the operation 76 (e.g. which beam selection will result in the overall lowest average PCO vector and variance). In addition, each angular point is evaluated over a radius of 1°, which is a small angular area compared to the expected angular spread observed in the typical channel between the gNB and the UE. As discussed further below, the procedure processes the data collected in operation 82 in an attempt to provide more suitable positioning metrics for use in the operation 76.

At operation 84, the data collected in operation 82 is normalised. For example, the PCO vector and variance for each angular evaluation point may be normalised to the antenna power.

Figure 9:
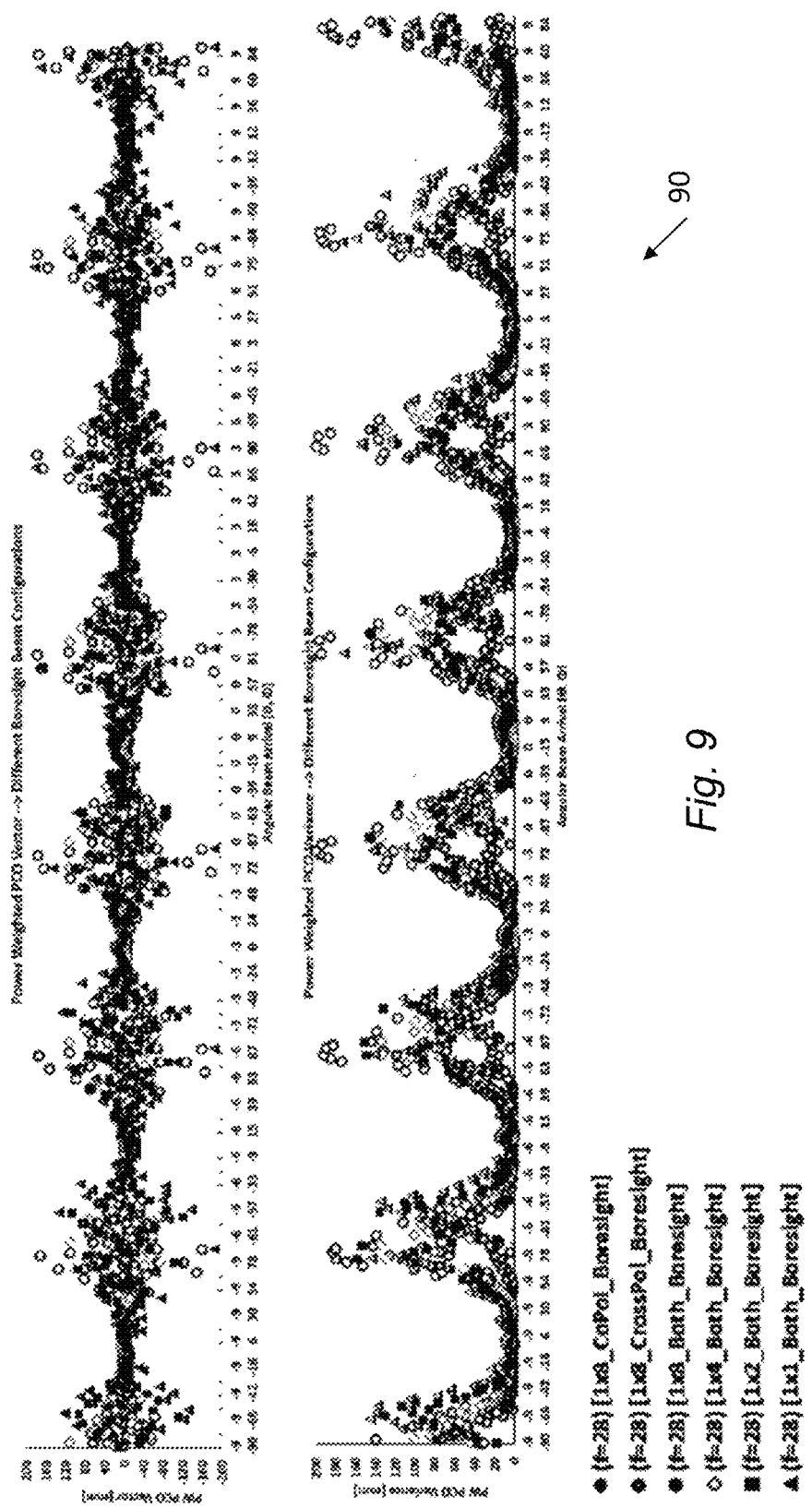
FIGS. 9 to 11 are plots showing data in accordance with example embodiments.

FIG. 9 is a plot, indicated generally by the reference numeral 90, showing data in accordance with an example embodiment. The plot 90 shows example normalised data that might be generated in the operation 84.

The operation 84 normalises the PCO vector and variance data to the maximum antenna gain of the selected evaluated beam configuration. The power normalization/weighting reduces the PCO vector and variance values for angular directions where the configured beam has lower antenna gain, since the contributions from such angular points will be smaller.

The normalization itself may be a straightforward procedure where the maximum gain point has a weight of 1 and an angular point with 3 dB less antenna gain has a weight of 0.5, an angular point with 6 dB less antenna gain has a weight of 0.25 and so forth.

The plot 90 shows the power weighted results of the PCO vector (upper plot) and variance (lower plot). Comparing the plots 60 and 90, it can be seen that the power weighting tends to reduce many of the larger values. The plot 90 may also represent a more realistic channel, since this will emulate certain amount of angular spread of the positioning reference signals.

At operation 86 of the procedure 80, power weighted averages (PWA) of the normalised PCO vector and variance data over a defined area are generated. As discussed further below, the output of the operation 86 may be average power weighted antenna PCO and variance data.

Figure 10:
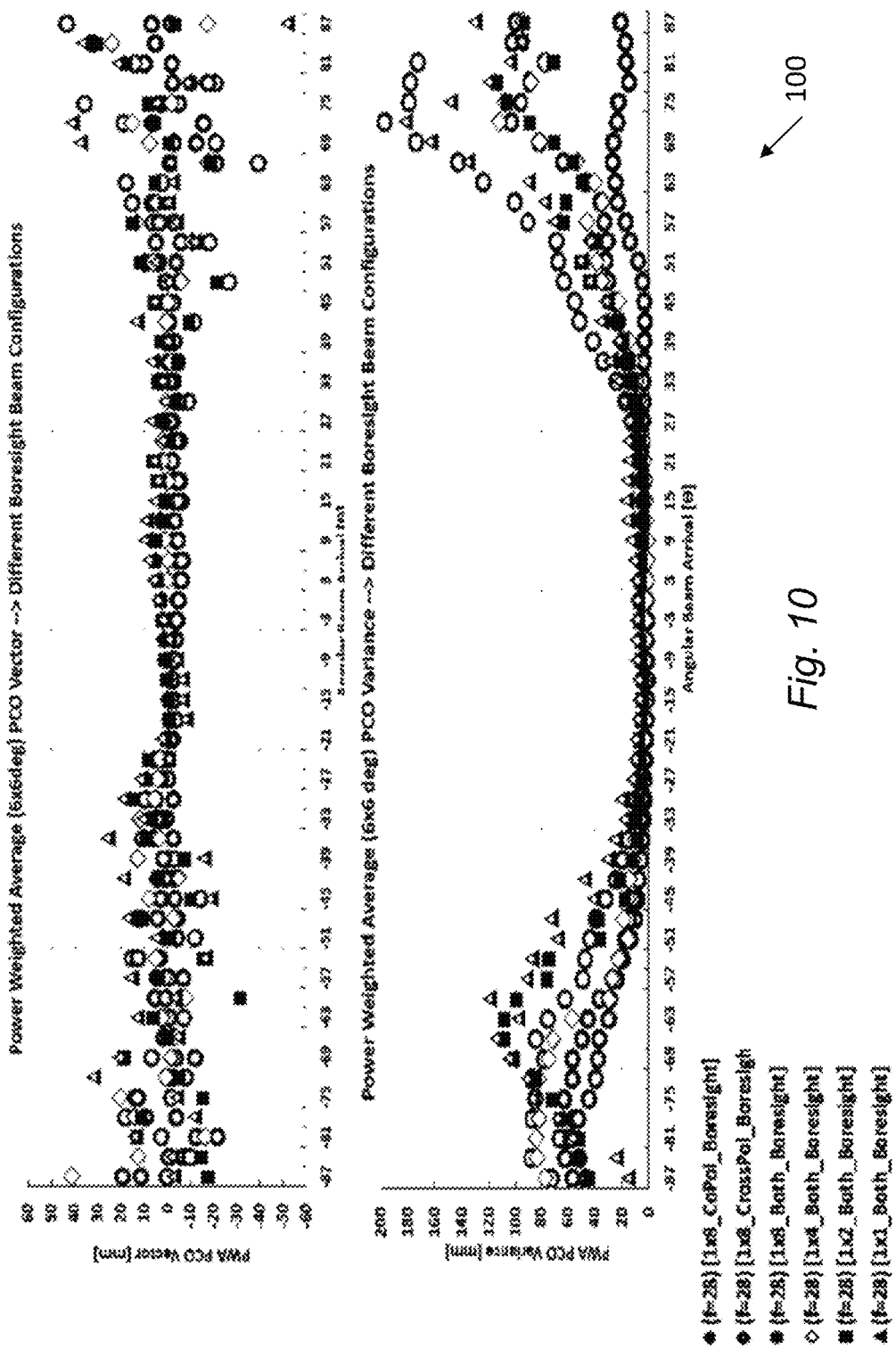

FIG. 10 is a plot, indicated generally by the reference numeral 100, showing data in accordance with an example embodiment. The plot 100 shows example data that might be generated in the operation 86.

The operation 86 generates a power weighted average (PWA) of the PCO vector and variance over a defined area.

The values measured in an anechoic chamber or simulated will theoretically have no angular spread (e.g. less than 2°), which is not always the case for a real propagation channel between the relevant gNB and the UE. However, the best position estimations may be obtained by using only Line of Sight (LoS) signals, for which a limited angular spread is expected in real life measurements. This is reflected in the operation 86 by making a power weighted averaging (PWA) over a selected area of 6°×6° and centering that area around the local maximum antenna gain. This result in a PWA PCO vector and variance value per θ angle (±42°), as shown in the plot 100.

The effect on the PCO vector and the variance of the different boresight beam configurations is typically easier to evaluate when utilizing PWA on a specific area and may make it easier for a UE to make a fast selection of the best array configuration for positioning reference signals, depending on whether the PCO vector or variance has the highest priority for the configured beam.

At operation 88 of the procedure 80, the power weighted PCO vector and variance data are combined in a single metric (which may be the metric considered in the operation 76 described above). That single metric may comprise a plurality of data points that comprise averages of antenna phase centre offset vector data points and corresponding antenna phase centre offset variance data points over the relevant angular radiation space.

Figure 11:
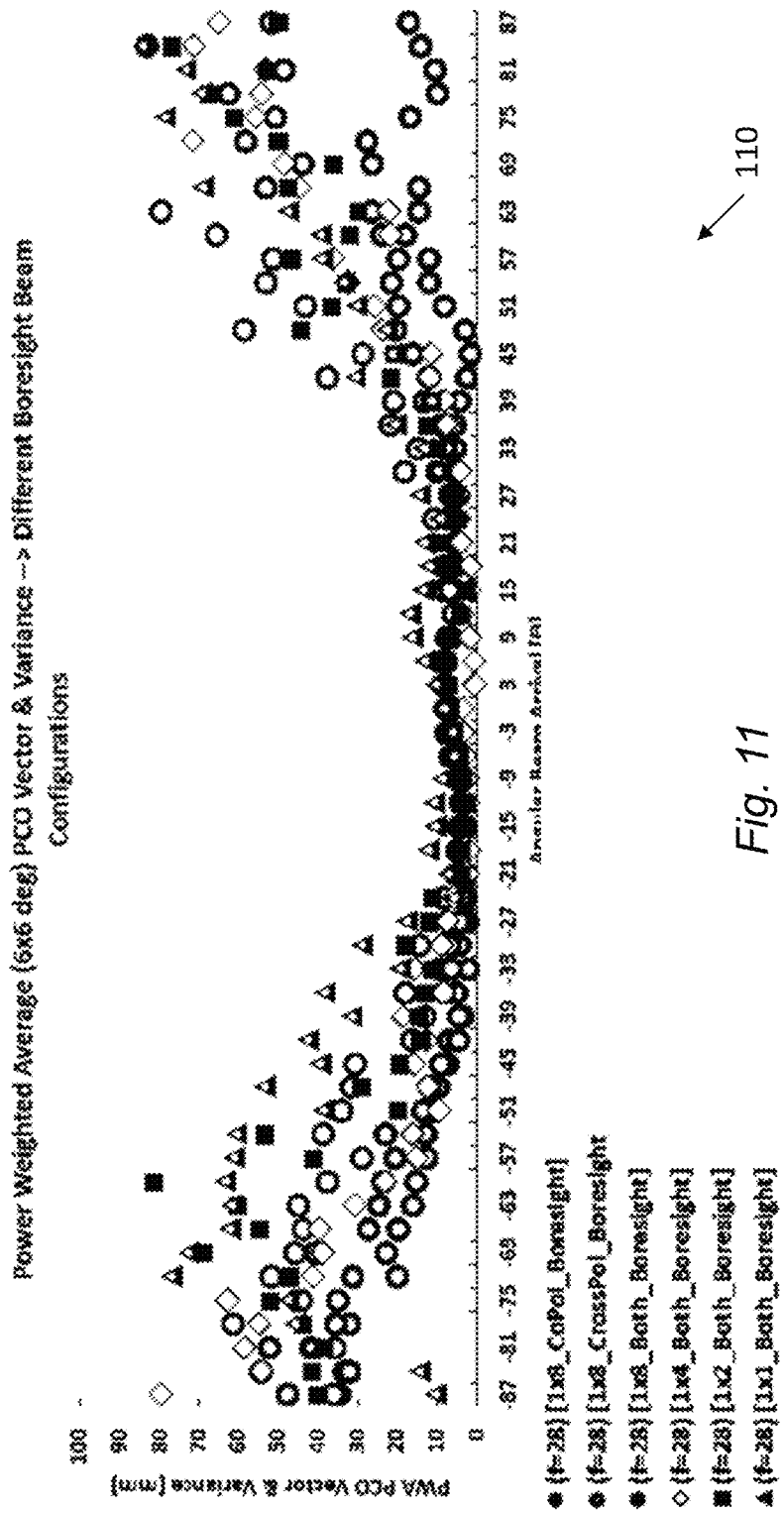

FIG. 11 is a plot, indicated generally by the reference numeral no, showing data in accordance with an example embodiment. The plot no shows example data that might be generated in the operation 88.

The plot no shows the PCO vector and the variance data combined into one single metric (PWA_PCO_vv), which can be used by the UE (in the operation 76) to select the best combined array configuration for positioning reference signals.

To generate the example data no, the combination was implemented using the following formula:

PWA_PCO_vv=abs(PWA PCO vector)+(PWA PCO variance)/2

The result was normalised to the maximum PWA PCO vector and variance value and converted into a percentage.

Of course, the PCO vector and variance data could be combined using different formulae to generate a different set of single positioning metrics.

The overall average of the values generated by an example implementation of the operation 88 for each boresight beam configuration for a number of different antenna configurations is shown in Table 1 below.

TABLE 1

Power Weighted Average (6° × 6°) Combined PCO vector and variance for different boresight beam configurations over different angular directions.
PWA Combined vector and variance

|  | 1 × 8 | | | 1 × 4 | 1 × 2 | 1 × 1 |
| --- | --- | --- | --- | --- | --- | --- |
|  | Co-Pol | Cross-Pol | Both | Both | Both | Both |
| Boresight | 12.7% | 40.2% | 19.2% | 22.8% | 27.2% | 36.9% |

It is seen from Table 1 that, in this example, the overall best boresight beam configuration selectable for highest positioning accuracy is the full array (1×8) configured for co-polarization alone (or for both polarizations if the additional 3 dB gain is needed).

The examples described above relate to boresight beam configurations. The combined power weighted average PCO vector and variance were also calculated for different steering angles for a full 1×8 antenna array as depicted in Table 2 below:

TABLE 2

PWA PCO vector and variance values for different array configuration for a full 1 × 8 array
PWA Combined vector and variance for full array configuration (1 × 8)

|  | Co-Pol | Cross-Pol | Both |
| --- | --- | --- | --- |
| Boresight | 12.7% | 40.2% | 19.2% |
| 7.5° | 5.2% | 20.0% | 7.7% |
| 15.0° | 31.4% | 36.4% | 30.7% |
| 22.5° | 45.9% | 19.6% | 33.8% |
| 30.0° | 46.3% | 17.0% | 35.1% |
| 37.5° | 32.6% | 12.8% | 26.8% |
| 45.0° | 55.2% | 17.5% | 23.3% |

It is clear to see from Table 2 that, in this example, the best array configuration for highest positioning accuracy changes as a function of the beam steering angle. This information can be used to improve the overall position accuracy for the UE which has no knowledge of the AoA/AoD.

Figure 12:
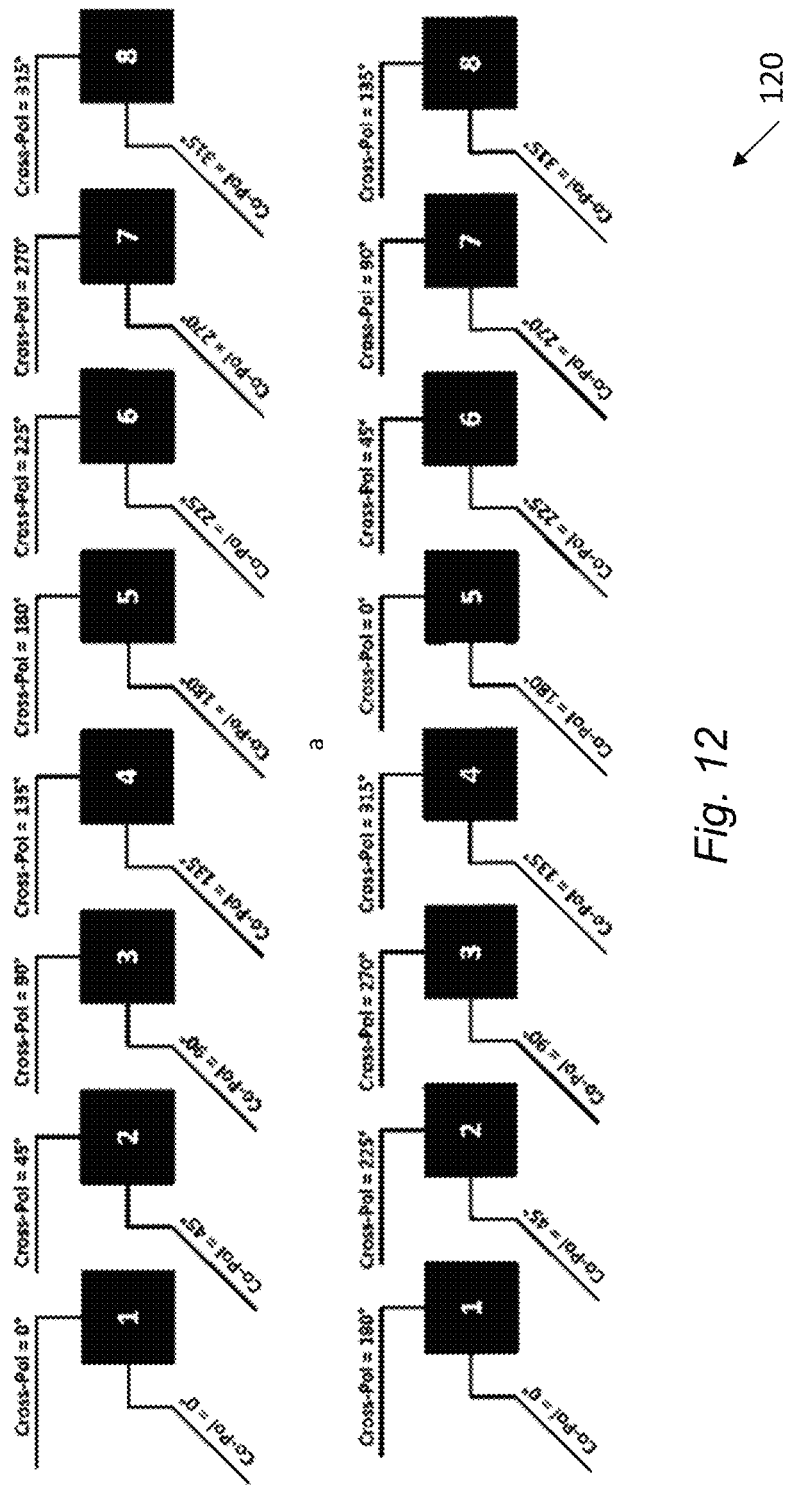
FIG. 12 is a block diagram of a system in accordance with an example embodiment.

FIG. 12 is a block diagram of a system, indicated generally by the reference numeral 120, in accordance with an example embodiment. The system 120 comprises an out-of-phase (OoP) polarisation arrangement, rather than typical in-phase polarisation.

The obtainable positioning accuracy will tend to suffer if both polarizations are needed due to link budget dictated gain requirement, which is a likely scenario since a high number of gNBs are need for accurate positioning estimation and some of those gNB will most likely be far away from the device. In addition, some devices might not be able to switch between single and dual polarization configuration.

It has been found that position accuracy can, in some circumstances, be improved for dual polarization configuration by offsetting the phase on one of the two polarizations by 180°, as illustrated in the system 120.

An updated selection table including PWA PCO vector and variance values for the out of phase array configurations is shown in Table 3 below.

TABLE 3

PWA PCO vector and variance values for different array configuration for a full 1 × 8 array including the Out of Phase configurations.
PWA Combined vector and variance for full array configuration (1 × 8)

|  | Co-Pol | Cross-Pol | Both | OoP |
| --- | --- | --- | --- | --- |
| Boresight | 12.7% | 40.2% | 19.2% | 25.0% |
| 7.5° | 5.2% | 20.0% | 7.7% | 12.6% |
| 15.0° | 31.4% | 36.4% | 30.7% | 21.0% |
| 22.5° | 45.9% | 19.6% | 33.8% | 19.9% |
| 30.0° | 46.3% | 17.0% | 35.1% | 19.2% |
| 37.5° | 32.6% | 12.8% | 26.8% | 15.4% |
| 45.0° | 55.2% | 17.5% | 23.3% | 27.5% |

In this example, using the out-of-phase feeding method would be the overall best choice for certain beam configuration settings and in most cases the best choice for dual polarization beam configurations.

In some example implementation of the procedure 70 described above, the positioning metrics available in the operation 76 include average antenna phase centre offset vector data and phase centre offset variance data for the user device for a first polarisation, a second polarisation and a combination of the first and second polarisations. Moreover, the said positioning metrics may comprise average antenna phase centre offset vector data and phase centre offset variance data for the user device for a first combination of first and second polarisations that are offset in phase relative to one another and a second combination of the first and second polarisations that are not offset in phase relative to one another.

Figure 13:
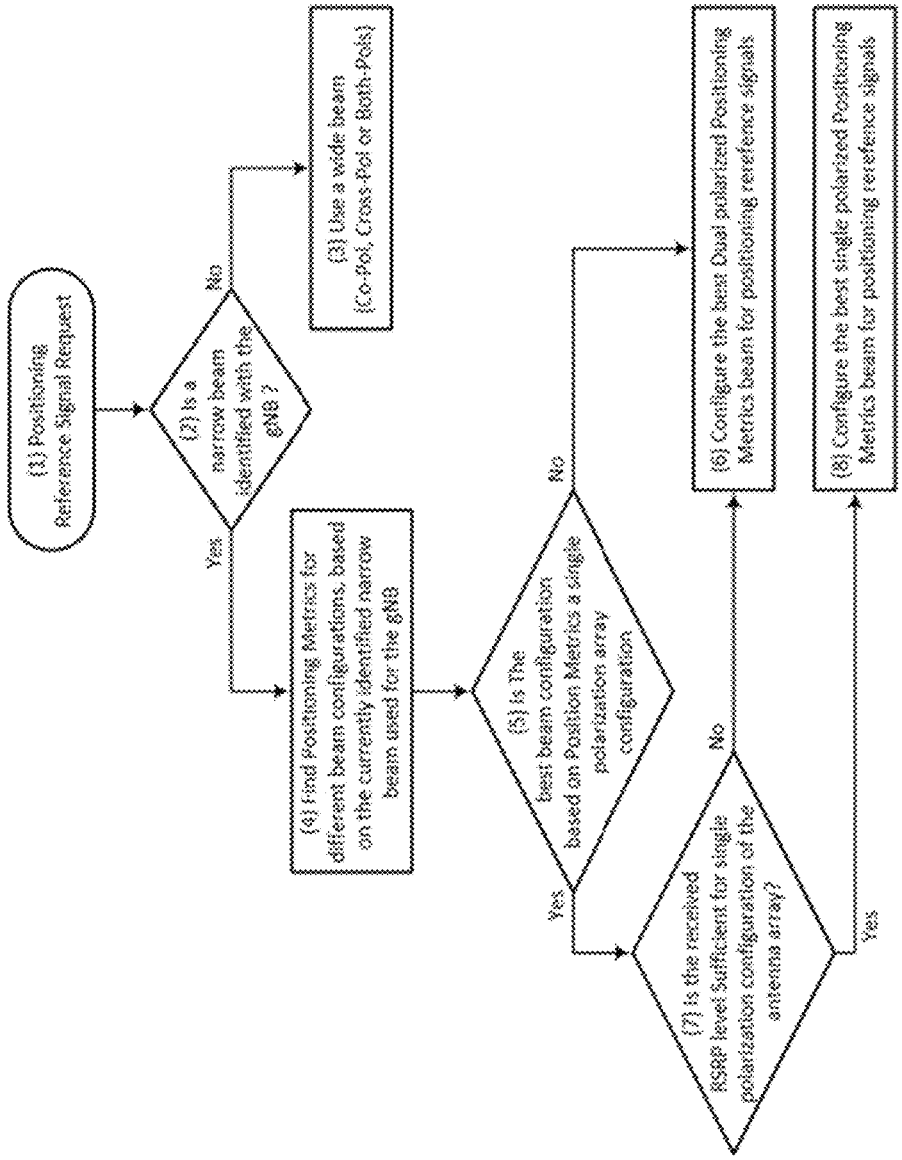
FIG. 13 is a flow chart showing a procedure in accordance with an example embodiment.

FIG. 13 is a flow chart showing a procedure, indicated generally by the reference numeral 130, in accordance with an example embodiment. The procedure 130 is an example implementation of the procedure 70 described above and may be used in the selection of an antenna configuration.

At step 1, a user device (such as the UE 12 or 20 described above) receives a request to receive or transmit a positioning reference signal.

At step 2, the user device determines if a narrow beam is identified for the intended gNB for the scheduled positioning reference signal. If so, the procedure moves to step 4; otherwise the procedure moves to step 3.

At step 3, the user device has not identified a narrow beam towards the gNB; thus, the user device has no knowledge of the angular direction of the gNB. The user device consequently configures for the best wide beam for the positioning reference signals, which can be a choice between Co-Polarization, Cross-Polarization or Both Polarizations.

At step 4, the user device has identified a narrow beam configuration which covers the gNB (but, for example, has no information on AoA/AoD direction within the beam coverage area). The user device finds the best array configuration for that particular search space by using positioning metrics, such as the PWA PCO vector and variance data generated using the procedure 70 described above.

At step 5, the user device determines if the best array configuration is single (Yes) or dual polarization (No). If the best identified array configuration is a single polarisation, the procedure moves to step 7. If the best identified array configuration is a dual polarisation, then the procedure moves to step 6.

At step 6, the user device configures a dual polarized beam for positioning reference signals.

At step 7, the user device determines if the link budget can support a single polarization array configuration with 3 dB reduced power. If so, the procedure moves to step 8; otherwise the procedure moves to step 6 (where a dual polarised beam is configured).

At step 8, the user device configures a single polarized beam for positioning reference signals.

In an optional step (not shown in the flow chart), if the user device is configured for time based positioning schemes, which is based on absolute time values, the user device may compensate the ToD/ToA with the average PCO inflicted time value for the selected beam configuration.

Most of the data discussed above relate to different boresight beam configurations. The Tables 1 to 3 discussed above also include data relating to different beam steering angles (i.e. other than boresight). Some additional data relating to some of those scenarios is discussed below.

Figure 14:
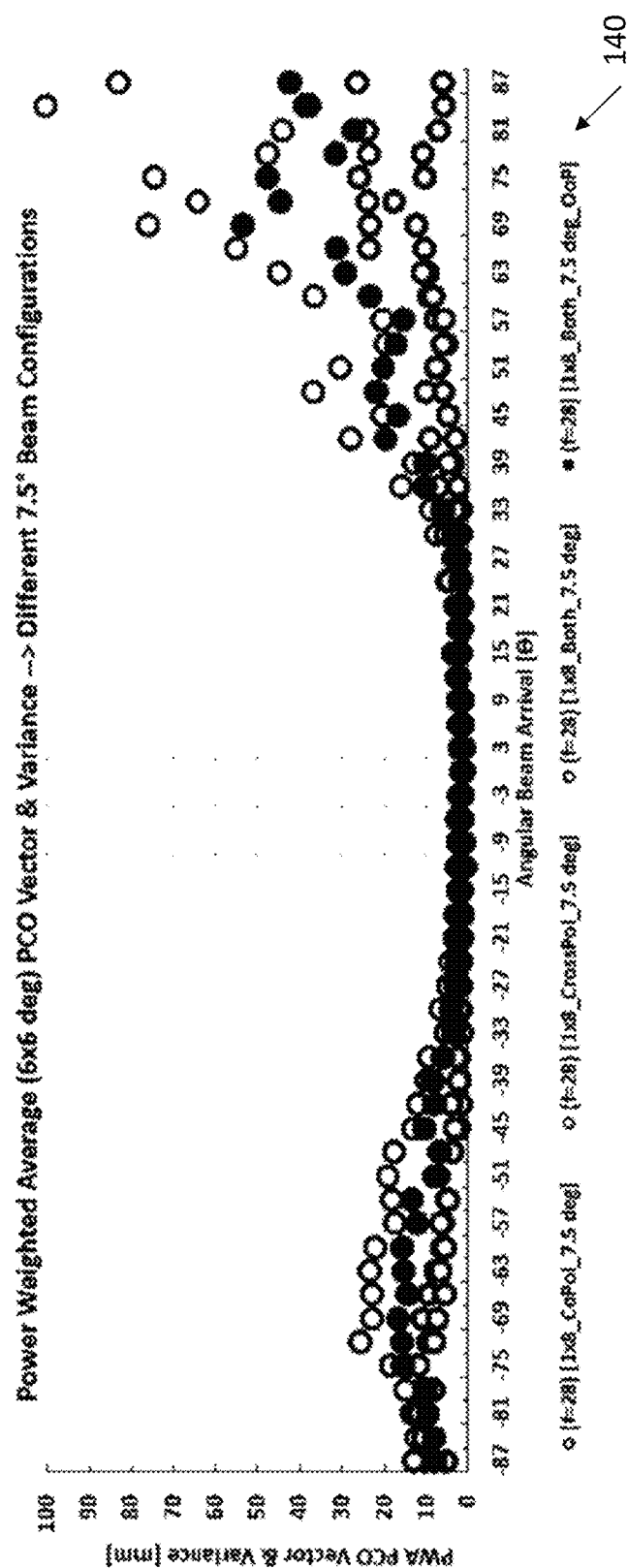
FIGS. 14 and 15 are plots showing data in accordance with example embodiments.

FIG. 14 is a plot, indicated generally by the reference numeral 140, showing data in accordance with an example embodiment. The data 140 shows the combined single metric power weighted PCO vector and variance data for 7.5° beam configurations.

Figure 15:
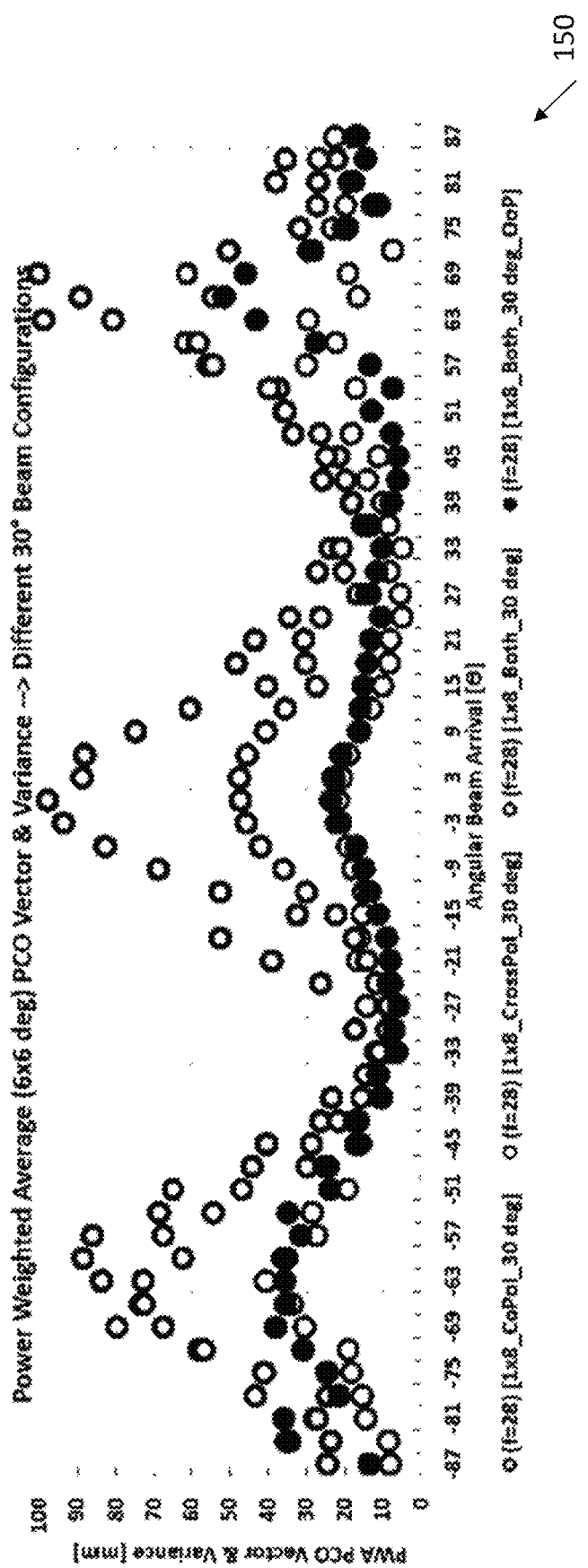

Similarly, FIG. 15 is a plot, indicated generally by the reference numeral 150, showing data in accordance with an example embodiment. The data 140 shows the combined single metric power weighted PCO vector and variance data for 30.0° beam configurations.

Data for other beam steering angles has been omitted for clarity.

Figure 16:
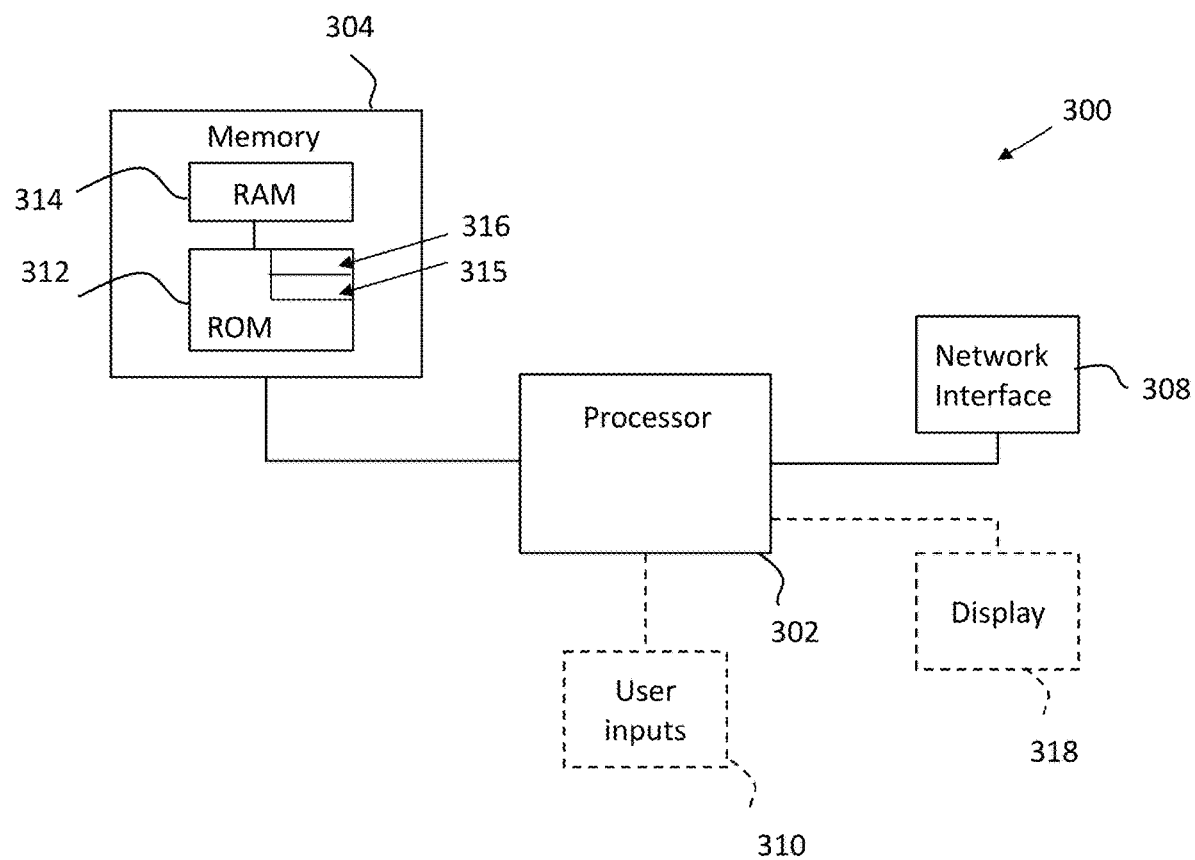
FIG. 16 is a block diagram of components of a system in accordance with an example embodiment.

For completeness, FIG. 16 is a schematic diagram of components of one or more of the example embodiments described previously, which hereafter are referred to generically as a processing system 300. The processing system 300 may, for example, be (or may include) the apparatus referred to in the claims below.

The processing system 300 may have a processor 302, a memory 304 coupled to the processor and comprised of a random access memory (RAM) 314 and a read only memory (ROM) 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the methods and procedures 70, 80 and 130 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 17:
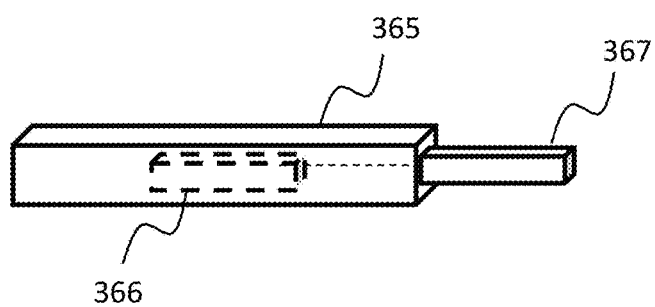
FIG. 17 shows an example of tangible media for storing computer-readable code which when run by a computer may perform methods according to example embodiments described above.

FIG. 17 shows tangible media, specifically a removable memory unit 365, storing computer-readable code which when run by a computer may perform methods according to example embodiments described above. The removable memory unit 365 may be a memory stick, e.g. a USB memory stick, having internal memory 366 for storing the computer-readable code. The internal memory 366 may be accessed by a computer system via a connector 367. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 7, 8 and 13 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus, comprising:
   at least one processor; and
   at least one memory storing instructions that, when executed by the at least one processor, cause the apparatus at least to perform:
   determining an angular radiation space of interest for communications between a user device and a network node of a mobile communication system;
   obtaining a positioning metric for a plurality of available antenna configurations for communication between the user device and the network node in the angular radiation space of interest, wherein said positioning metrics are based, at least in part, on average antenna phase center offset vector data and phase center offset variance data for the user device; and
   selecting one of said plurality of antenna configurations, based on the obtained positioning metrics, for sending positioning signals from the user device to the network node or for receiving positioning signals at the user device from the network node.

2. The apparatus as claimed in claim 1, wherein the selecting comprises selecting the antenna configuration of the plurality having the lowest average antenna phase center offset vector data and phase center offset variance data.

3. The apparatus as claimed in claim 1, wherein the at least one memory and instructions, when executed by the at least one processor are further configured to cause the apparatus to perform:
   determining whether a beam is identified for communications between the user device and the network node and, if so, defining the angular radiation space of interest as a direction of said beam and, if not, defining the angular radiation space of interest as a widebeam angular space.

4. The apparatus as claimed in claim 1, wherein the positioning metrics are based on antenna phase center offset vector and variance data that have been measured or simulated in advance.

5. The apparatus as claimed in claim 1, wherein the positioning metrics comprise average power weighted antenna phase center offset vector and variance data.

6. The apparatus as claimed in claim 1, wherein the positioning metrics comprise antenna phase center offset vector and variance data combined into single data points.

7. The apparatus as claimed in claim 6, wherein each of said single data points comprise averages of antenna phase center offset vector data points and corresponding antenna phase center offset variance data points over the relevant angular radiation space.

8. The apparatus as claimed in claim 1, wherein said positioning metrics comprise average antenna phase center offset vector data and phase center offset variance data for the user device for a first polarization, a second polarization and a combination of the first and second polarizations.

9. The apparatus as claimed in claim 1, wherein said positioning metrics comprise average antenna phase center offset vector data and phase center offset variance data for the user device for a first combination of first and second polarizations that are offset in phase relative to one another and a second combination of the first and second polarizations that are not offset in phase relative to one another.

10. The apparatus as claimed in claim 8, wherein the at least one memory and instructions, when executed by the at least one processor, cause the apparatus to further perform:
    determining whether power signal levels are sufficient for sending or receiving said positioning signals using an antenna configuration having a single polarization, wherein said selecting said one of said plurality of antenna configuration said selecting said one of said plurality of antenna configuration makes said selection accordingly.

11. The apparatus as claimed in claim 1, wherein said positioning metrics comprise average antenna phase center offset vector data and phase center offset variance data for the user device in different antenna beam steering directions.

12. The apparatus as claimed in claim 1, wherein said positioning signals comprise at least one of positioning reference signals and sounding reference signals.

13. The apparatus as claimed in claim 1, wherein the apparatus is the user device.

14. A method comprising:
 determining an angular radiation space of interest for communications between a user device and a network node of a mobile communication system;
 obtaining a positioning metric for a plurality of available antenna configurations for communication between the user device and the network node in the angular radiation space of interest, wherein said positioning metrics are based, at least in part, on average antenna phase center offset vector data and phase center offset variance data for the user device; and
 selecting one of said plurality of antenna configurations, based on the obtained positioning metrics, for sending positioning signals from the user device to the network node or for receiving positioning signals at the user device from the network node.

15. A non transitory computer-readable medium comprising computer program instructions encoded thereon, said instructions, when executed on an apparatus, cause the apparatus to perform at least:
 determining an angular radiation space of interest for communications between a user device and a network node of a mobile communication system;
 obtaining a positioning metric for a plurality of available antenna configurations for communication between the user device and the network node in the angular radiation space of interest, wherein said positioning metrics are based, at least in part, on average antenna phase center offset vector data and phase center offset variance data for the user device; and
 selecting one of said plurality of antenna configurations, based on the obtained positioning metrics, for sending positioning signals from the user device to the network node or for receiving positioning signals at the user device from the network node.

* * * * *